United States Patent [19]

Rauschenberger

[11] Patent Number: 4,565,404
[45] Date of Patent: Jan. 21, 1986

[54] HINGE

[76] Inventor: Joerg Rauschenberger, Gartenstrasse 8, 7144 Asperg, Fed. Rep. of Germany

[21] Appl. No.: 399,987

[22] Filed: Jul. 19, 1982

[30] Foreign Application Priority Data

Jul. 23, 1981 [DE] Fed. Rep. of Germany ....... 3129089

[51] Int. Cl.[4] .......................... A47C 4/00; B60N 1/02
[52] U.S. Cl. ...................................... 297/19; 297/54; 297/369; 297/379
[58] Field of Search ............... 297/379, 366, 367, 368, 297/369, 19, 53, 16, 54; 403/92, 93

[56] References Cited

U.S. PATENT DOCUMENTS

| 3,232,136 | 2/1966 | Bahmüller | 297/366 |
| 3,580,635 | 5/1971 | Posh | 297/379 |
| 3,779,655 | 12/1973 | Toyota | 403/93 |
| 3,807,796 | 4/1974 | Wirges | 297/379 |
| 3,880,464 | 4/1975 | Murphy et al. | 297/379 |
| 4,132,447 | 1/1979 | Terada | 297/379 |
| 4,406,497 | 9/1983 | Klüting | 297/366 |

FOREIGN PATENT DOCUMENTS

| 1148050 | 5/1963 | Fed. Rep. of Germany | 297/366 |
| 2360267 | 6/1974 | Fed. Rep. of Germany | |
| 2846360 | 5/1980 | Fed. Rep. of Germany | |
| 223012 | 10/1968 | Sweden | 297/366 |
| 364596 | 11/1962 | Switzerland | 297/366 |

Primary Examiner—William E. Lyddane
Assistant Examiner—Mark W. Binder
Attorney, Agent, or Firm—Michael J. Striker

[57] ABSTRACT

A hinge, particularly for an article for lying, sitting, and the like, has a hinge part supporting a rest member and turnable between and arrestable in a plurality of positions, a power element turning the hinge part in closing direction, an arresting element for arresting the hinge part, and a turnable intermediate element cooperating with the hinge part and arranged so that it supports the hinge part in its turning direction or is coupled with the hinge part in one turning region between a substantially horizontal and a substantially vertical position of the rest member, and the hinge part is separately turnable in a remaining turning region.

5 Claims, 10 Drawing Figures

HINGE

BACKGROUND OF THE INVENTION

The present invention relates to a hinge, particularly of an article for lying, sitting, and the like, such as foldable beds, seats, and so forth.

Hinges of the above-mentioned general type are known in the art. A known hinge has a hinge part which carries a rest member and is turnable and arrestable in a plurality of different angular positions, an intermediate member such as for example a notched disk cooperating with at least the hinge part, wherein the hinge part in its arrestable turning region is turned in forced manner in closing direction by a power member such as a spring or a gas spring, and is retained by an arresting element. Such a hinge is disclosed, for example, in the German Offenlegungsschrift No. 2,360,267 as utilized in front seats of an automotive vehicle. A sprial spring serves here as the power member. This results in a relatively voluminous construction when it is necessary to accumulate a sufficient energy. During release of the arresting element, the complete spring force is released so that the rest can strike upwardly. In the automotive-vehicle seats, this is of disadvantage since here the rest members during adjustment are loaded by a passenger. With the utilization of such a hinge for foldable seats or beds, the above-mentioned strikes in upward direction are dangerous.

Another such hinge is known from German Offenlegungsschrift No. 2,846,360. It provides for an adjustment of the inclination of a rotary office chair with the utilization of an arrestable gas spring. It also possesses considerable disadvantages.

SUMMARY OF THE INVENTION

Accordingly, it is an object of the present invention to provide a hinge which avoids the disadvantages of the prior art.

More particularly, it is an object of the present invention to provide a hinge which is an improvement of the hinge disclosed in German Offenlegungsschrift No. 2,360,267 and formed so that the energy accumulated by the spring is used in a maximally optimal manner in the desirable angular adjusting region of the rest member, in order to maintain the required spring volume as small as possible.

In keeping with these objects, and with others which will become apparent hereinafter, one feature of the present invention resides, briefly stated, in a hinge having an intermediate member, wherein the intermediate member in one turning region of a hinge part between a substantially horizontal position and a substantially vertical position of the rest member supports the hinge part in its turning direction or is connected with the hinge part in this region, and in a remaining turning region it turns separately from the hinge part.

In accordance with another advantageous feature of the present invention, a power member acts directly or indirectly on the intermediate member, which only in a force-supporting turning region is coupled with or supports the hinge part and must be turnable. The intermediate member is coupled with the power member with a maximum direct transmission in order to make possible a minimum transmission of the force of the power member relative to the intermediate member.

A further, especially advantageous feature of the present invention is that a blockable gas spring serves as the arresting member and also as the power member, and its end is coupled directly or indirectly with the intermediate member. Because of the utilization of the blockable gas spring, the arrangement of an additional blocking element, with for example a toothed disk or a respective blocking lever, is no longer necessary, so that a simple construction with low weight is possible. Advantageously, the gas spring is damped, so that undesirable impacts of the rest member cannot take place.

An especially stable and compact construction is provided when the intermediate member is formed as a sheet disk which is turnable about the same axis about which the hinge part turns. The sheet member, depending upon the position of the hinge part, is coupled with or released from the hinge part, or abuts against the hinge part in its turning direction in arresting condition.

In a very simple mechanical manner, a catch which cooperates with the hinge part can be supported on the sheet disk turnably against the action of a spring. The catch can be engageable with the hinge part and thereby the power member is coupled directly or indirectly with the hinge part, wherein the engagement is controlled automatically by the position of the hinge part. The catch can release the hinge part in one end position of the intermediate member, and be coupled with the hinge part in all other positions of the intermediate member. For space economy, the catch and an end of the power member can be turnably supported on a common supporting pin at the free end of the intermediate member, and the other end of the power member can be turnably coupled on the hinge shell.

For coupling and uncoupling of the intermediate member and the hinge part in dependence on the position of the intermediate member, the catch can be formed as a two-arm lever whose one arm end carries a hook cooperating with the hinge part, with the other arm end cooperating with a stop for catch actuation.

The hinge is especially stable to high and impacting forces when the hinge part has two lateral plates, advantageously triangular, which extend parallel to the intermediate member and are connected with one another by a transverse wall which is opposite to the common axis, and the transverse wall has an opening for the hook of the catch. For reducing the surface pressure, one side of each lateral plate of the hinge part can abut in the arrestable turning region against the supporting surfaces of the intermediate member. For further shape stabilizing, the supporting surfaces can be formed by stamping out.

For taking up high forces and providing small structure, the intermediate member can be formed by two ¼ circular sheet disks carrying arresting teeth at their periphery. The disks are connected at their side opposite to the power member via a connecting piece, and an end of the power member between the disks is supported by a supporting pin. The lower end of the transverse wall of the hinge part can abut in the coupled turning region against the connecting piece of the disks of the intermediate member. The forces which take place can be transmitted in a maximum wear-free manner with low surface pressure.

It is especially advantageous when the hinge has a foot part turnably supported on the hinge shell and lockable in the coupled or supporting turning region of the hinge part, wherein the foot part is lockable by a foot catch. The foot catch in the arrestable turning region of the intermediate member holds the foot part, and in the end position of the intermediate member releases the same. The foot catch is directly or indirectly controllable by the intermediate member.

It is especially advantageous, in the sense of construction, when the catch for the hinge part and the foot catch for the foot part are controllable by the movement of the intermediate member. For this purpose, both catches can be formed as two-arm levers, wherein the free ends of both arms in the end position of the disk or arresting disk abut against one another and release the hinge part and the foot part.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The drawing shows a hinge in accordance with the present invention in different embodiments, wherein similar parts of the hinge are identified by similar reference numerals.

The inventive hinge has a hinge or housing shell 1 with outer walls 2 and 2'. A power member 3 formed as a gas spring, a hinge part 4 carrying at its one side a not shown rest member, and a foot part 5 are turnably supported between the outer walls 2 and 2'. One end of the gas spring 3 is turnably mounted on a pin 6, the hinge part 4 and an arresting disk 7 are turnably mounted via a sleeve 8 and a pin 9, and the foot part 5 is turnably mounted via a supporting pin 10.

The foot part 5 has two plates 11 extending parallel at a distance from one another in the hinge shell 1 and guided on the supporting pin 10. They are connected of one piece with a lateral wall 12 opposite to the supporting pin 10. The lateral wall 12 forms at its upper end an end stop 13 which cooperates with a transverse wall 14 in the mounting position of the foot part 5 and abuts against the same. An opening 15 is provided in the lateral wall 12 at a distance from the end stop 13, as shown in broken lines. A projection 16 of a foot catch 17 engages in the opening 15 in the working position of the foot part 5. The foot catch 17 formed as a two-arm lever is turnably supported on a rivet 18 and held by a spring 19 in the locked position.

The spring 19 is a flat spring. Its end facing toward the foot catch is curved circularly in the intermediate space between the foot catch 17 and the supporting pin 10 and partially surrounds the latter, so that the spring 19 is held in this position by its spring force. A long leg 20 of the spring 19, which is opposite to the foot catch 17, is somewhat bent and lies at the free end of a blocking lever 21 and presses its teeth 22 in arresting teeth 23 of the arresting disk 7. Thereby the arresting disk 7 is arrested in its adjusting position and prevents turning movement. The blocking lever 21 with a U-shaped cross section is supported turnably on a pin 24 in the hinge shell 1 and actuated via a pipe 25 extending outwardly from the hinge shell 1. The pipe 25 forms thereby a manual actuating element 26.

Corresponding to the U-shaped cross section of the blocking lever 21, the arresting disk 7 is also formed by two ¼ circular sheet disks 27 arranged at a distance from one another and connected of one piece by a connecting member 28 at the side facing toward the hinge part 4. The connecting piece 28 has a recess 29 for a catch 30 which is turnably supported between the disks 27 in a slot 31 of the power member 3 on a supporting pin 32. The power member 3 has an end which is opposite to the pin 6 and is supported with this end on the supporting pin 32.

The catch 30 is also a two-arm lever. A hook 33 is provided at its one end and holds the hinge part 4 in an opening 34 of its transverse wall 35. The transverse wall 35 has two lateral plates 36 which are substantially triangular and connected with one another so as to provide for a form-stable hinge part 4. The hinge part 4 is coupled via the hook 33 in the working positions with the arresting disk 7, and thereby in this turning region movement is possible only after lifting of the blocking lever 21 by the manual actuating member 26.

Figure 1:
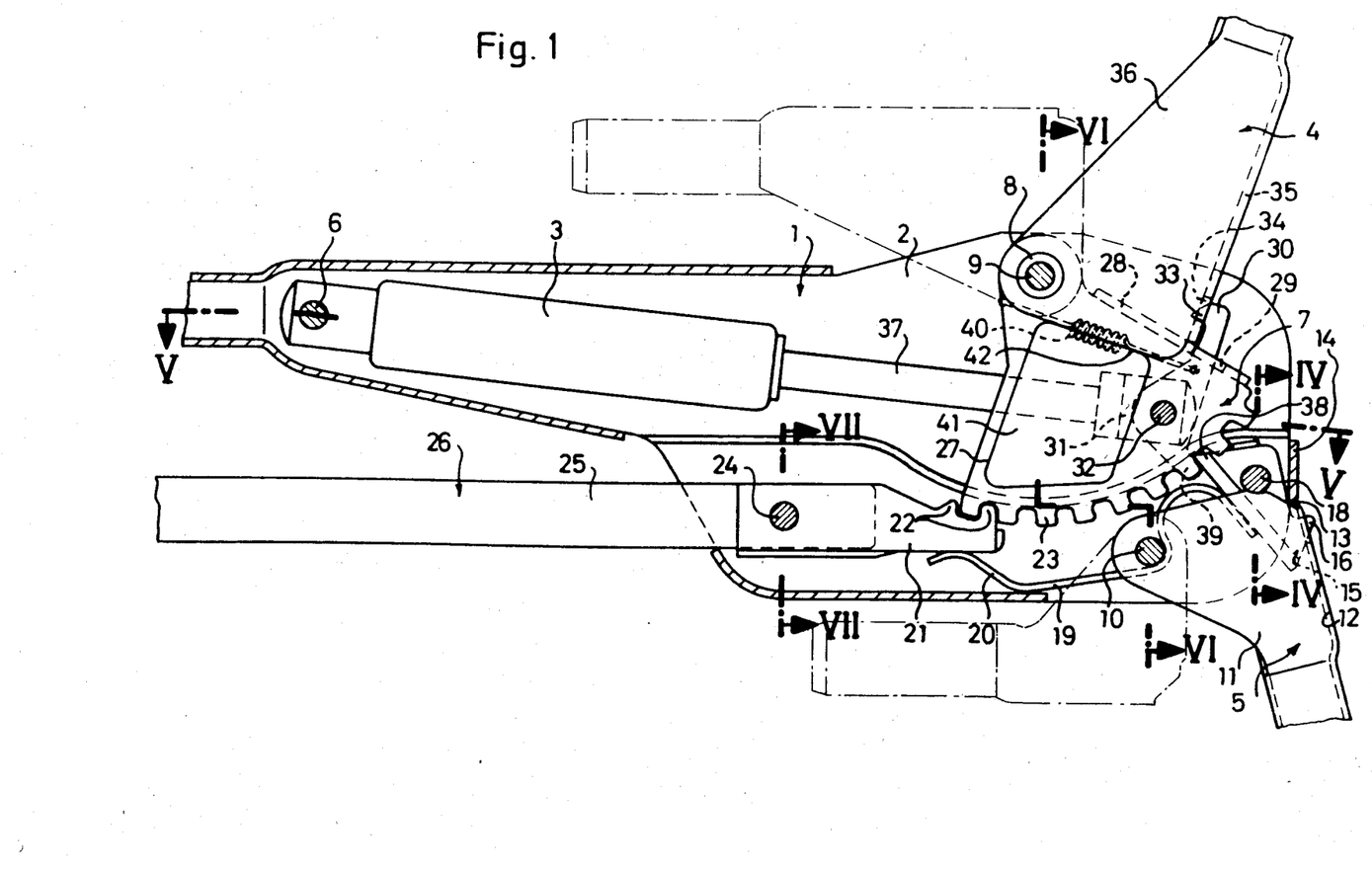
FIG. 1 is a view showing a section of a hinge with a substantially raised and arrested hinge part, and a folded hinge part shown in broken lines.
Figure 2:
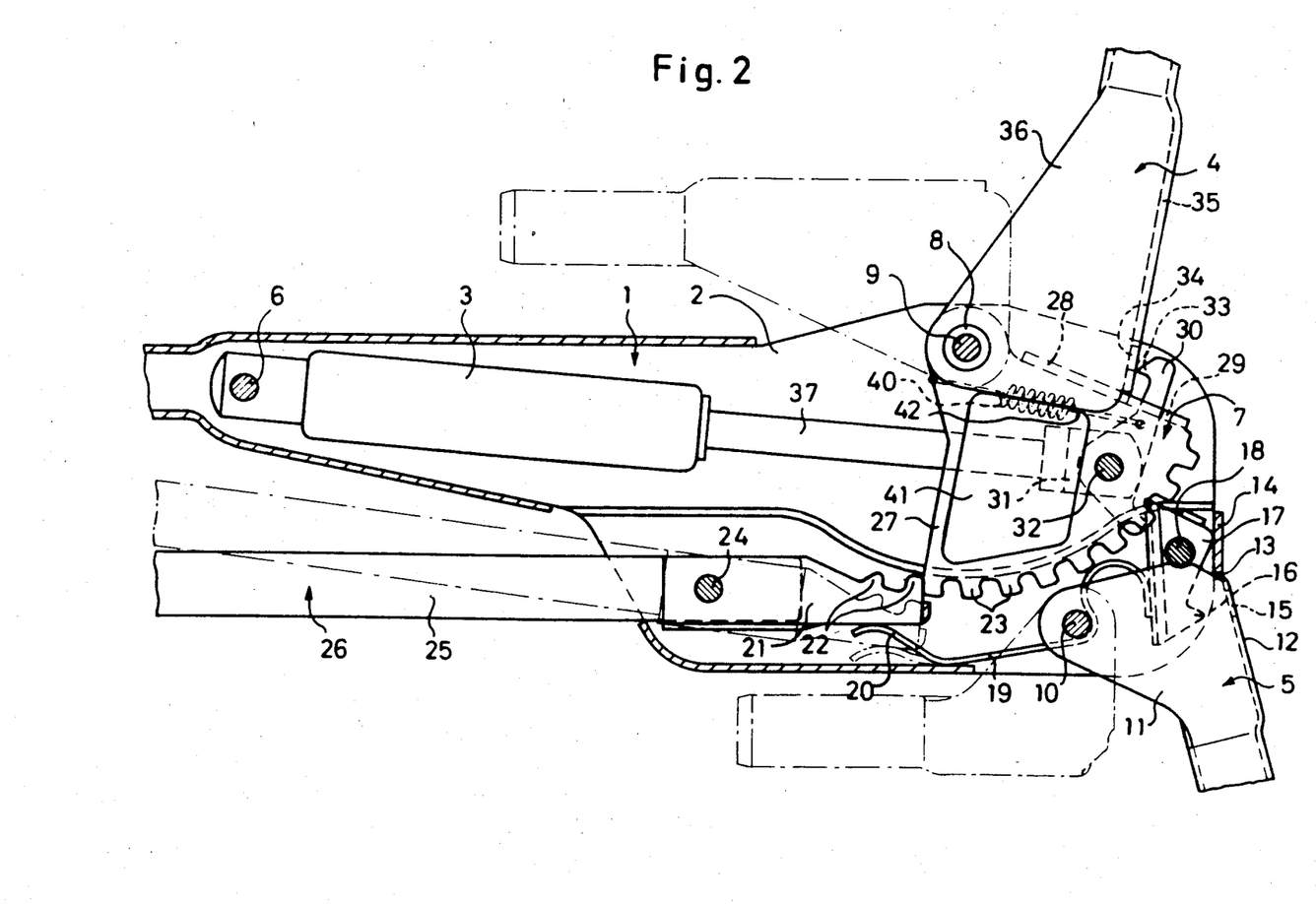
FIG. 2 is a view substantially corresponding to the view of FIG. 1, with the further turned hinge part which is released for folding and has an unlocked foot part.
Figure 3:
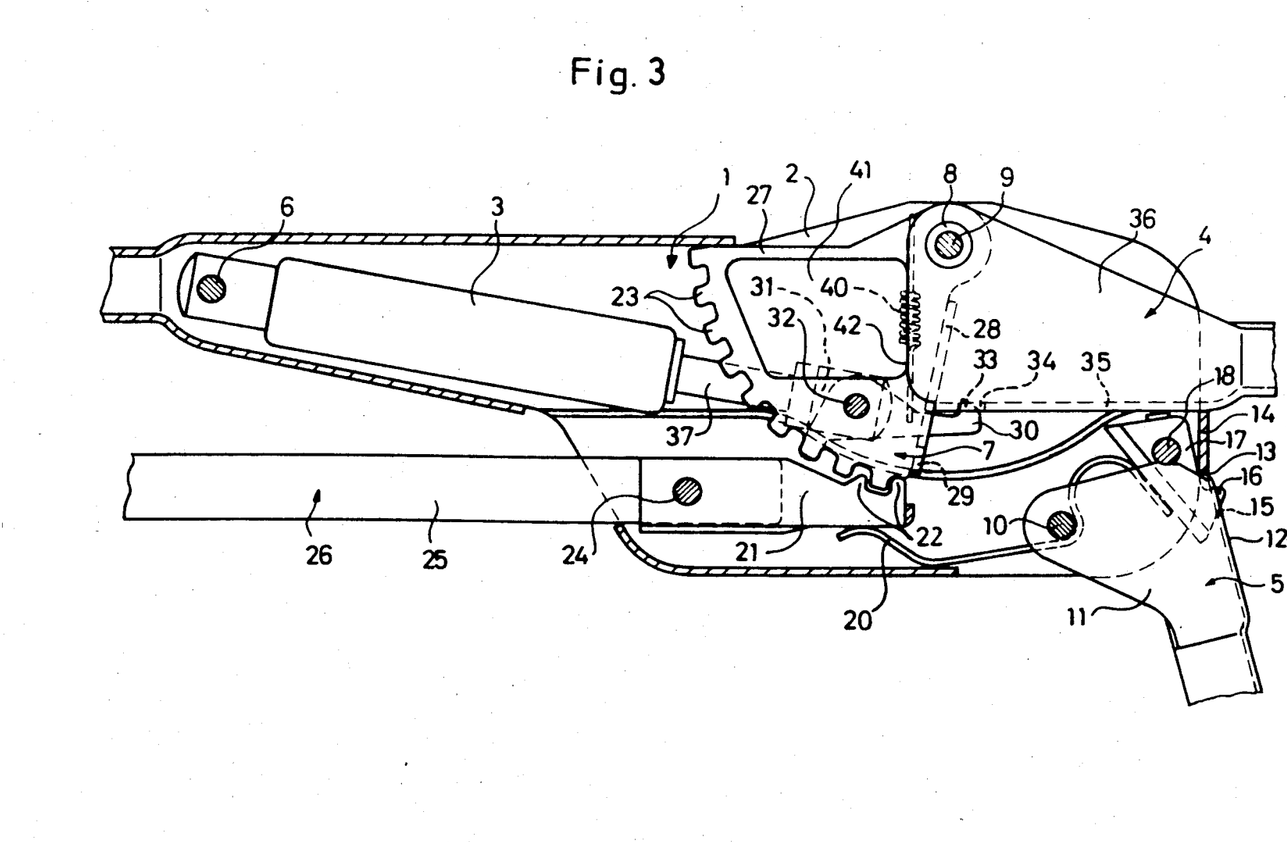
FIG. 3 is a view showing a section of the hinge of FIGS. 1 and 2 in an unfolded rest position of the hinge part.
Figure 4:
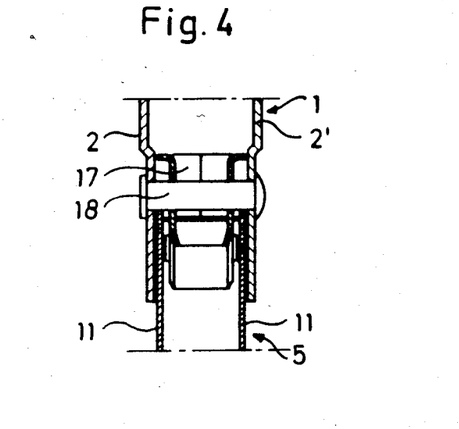
FIG. 4 is a view showing a section taken along the line IV—IV in FIG. 1 through a support of the foot part.
Figure 5:
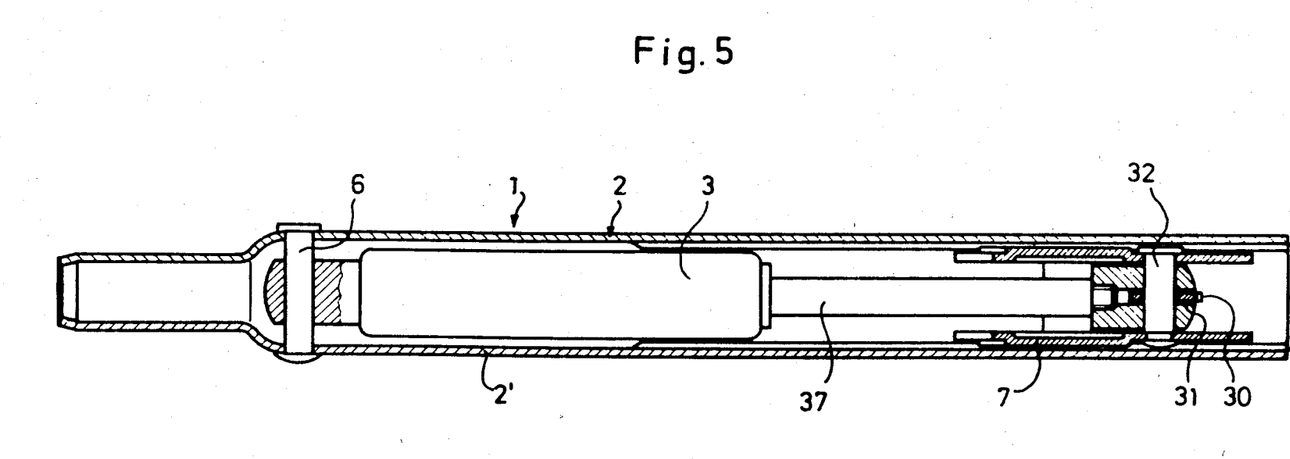
FIG. 5 is a longitudinal section taken along the line 5—5 of the hinge shown in FIG. 1.
Figure 6:
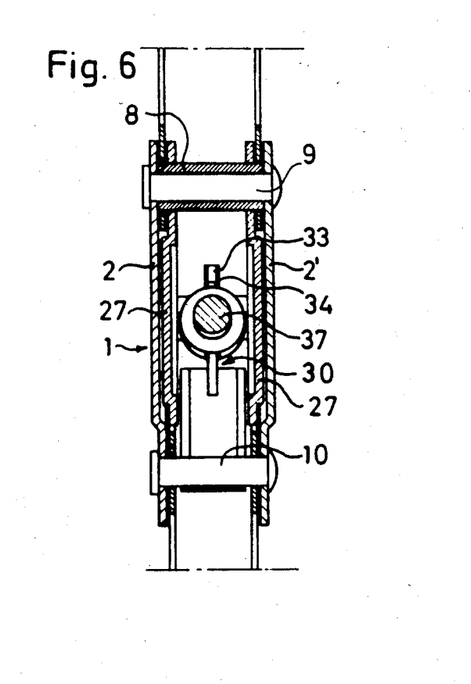
FIG. 6 is a view showing a section taken along the line 6—6 in FIG. 1 through the support of the hinge part and the foot part.
Figure 7:
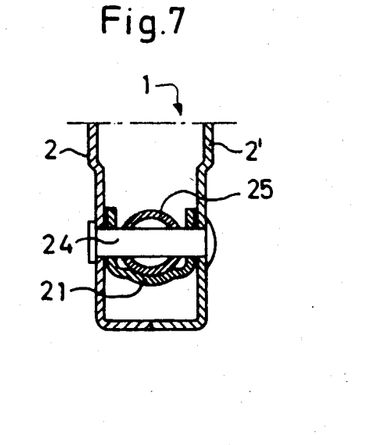
FIG. 7 is a view showing a section taken along the line 7—7 in FIG. 1 through the support of a locking lever.

The power member 3 is a gas spring whose piston rod 37 is forcibly actuated via a gas accumulating pressure in direction toward the supporting pin 32. Thereby during release of the blocking lever 21, the hinge part 4 is turned upwardly until it assumes the position shown in FIG. 2, via the power member 3. In this position free ends 38 and 39 of the foot catch 17 and the catch 30 abut against one another, so that both levers 17 and 30 are turned back against the action of the spring 19 and a pulling spring 40. The foot part 5 and the hinge part 4 are released, so that then these parts can be turned to inoperative positions shown in broken lines in FIG. 1, in which the article is folded for space economy (FIGS. 1 and 2). In the turning region between the positions shown in solid and broken lines of the hinge part 4, the power member 3 cannot act upon the hinge part 4, and the hinge part 4 in this region is turnable in a force-free manner. In the remaining region between the positions shown in FIGS. 2 and 3, the power member 3 is active and tends to upwardly turn the arresting disk 7 and thereby the hinge part 4. For preventing excessively high turning speeds during the release, the movement of the piston rod 37 is damped. In the working position the transverse wall 35 of the hinge part 4 abuts against the connecting piece 28 of the arresting disk 7. For increasing the contact surfaces, the ¼ circular sheet disks 27 are provided with a reinforcing stamping-out 41 and form an abutment surface 42 for the lateral plates 36.

Figure 8:
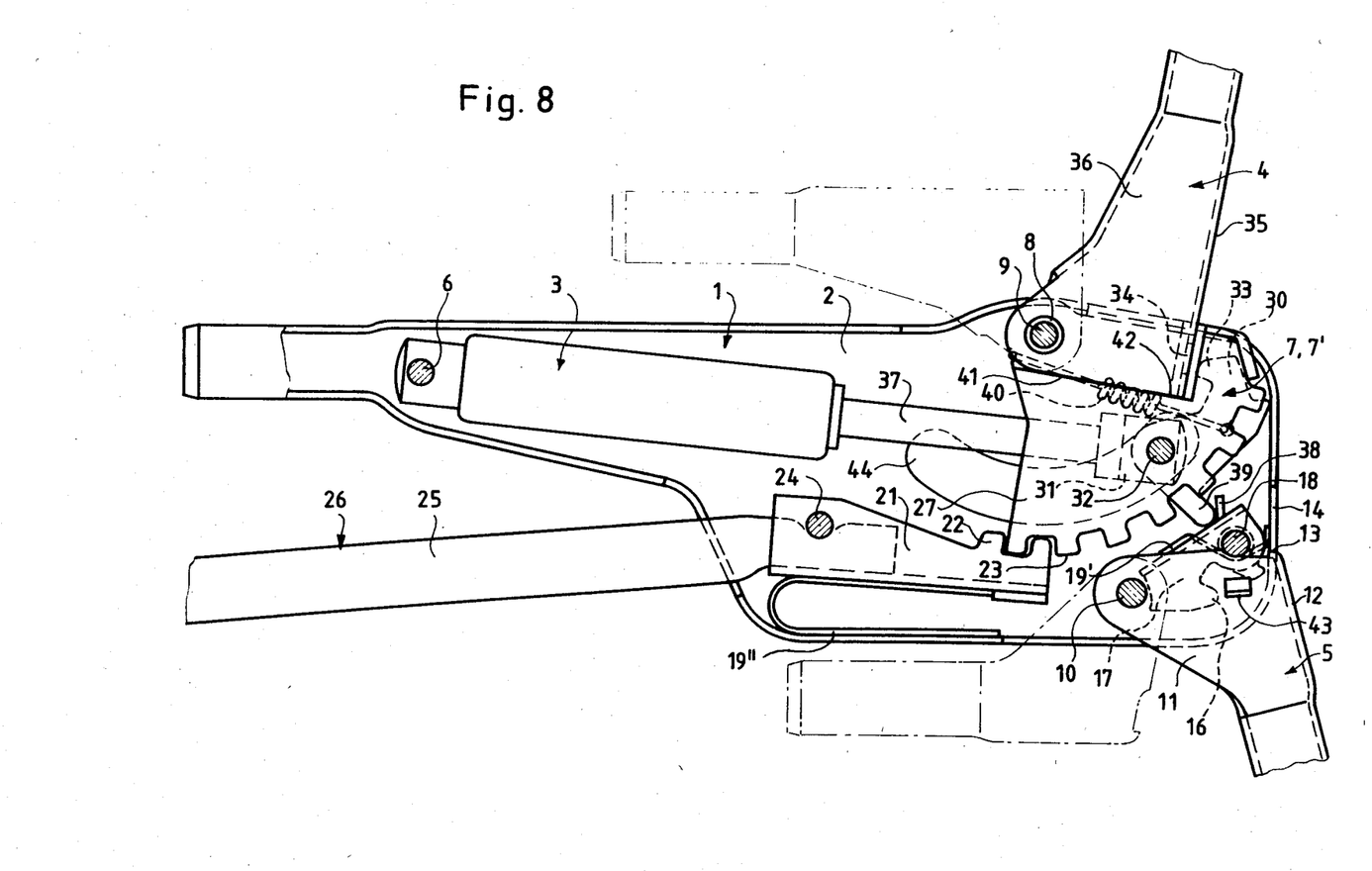
FIGS. 8 and 9 are views showing two further embodiments of the hinge in accordance with the present invention.

The hinge in accordance with the embodiment shown in FIG. 8 substantially corresponds to the hinge of FIG. 1. Instead of the spring 19, which performs two functions, a leg spring 19' is provided for the foot catch 17 and a U-shaped flat spring 19" is arranged for the manual actuating member 26. The foot catch 17, which has a U-shaped cross section, engages with both its projections 16 behind an inwardly extending projection 43 of the plates 11 of the foot part 5. The projections 43 are formed by cut out inwardly pressed bends.

Figure 9:
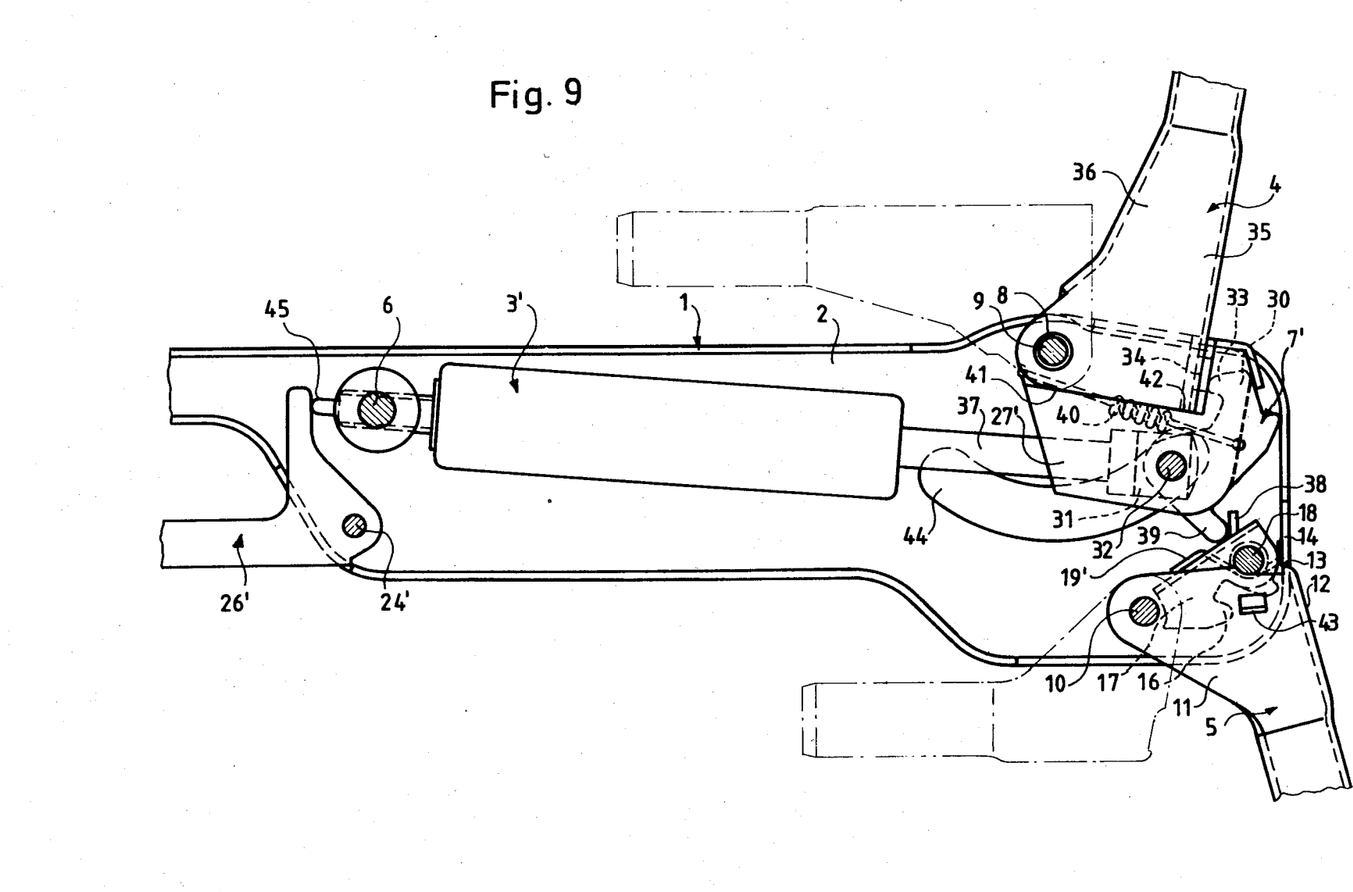

A hinge in accordance with the embodiment shown in FIG. 9 has a blockable gas spring serving as the power member 3. The gas spring is locked or unlocked via a manual actuating member 26' and a releasing device 45. Thereby the arrangement of the arresting disk 7, which is adjustable in stepped manner, can be dispensed with. The intermediate member 7' is considerably simpler and smaller. In all other respects, the construction shown in FIG. 9 corresponds to the construction shown in FIG. 8, wherein the hinge part 4 can be adjusted by the blockable gas spring 3' in the arrestable turning region in a stepless manner in both directions.

The force of pretensioning of the power member 3 is advantageously so selected that the hinge part 4 turns the rest member under the action of its own weight from its open position to an approximately vertical position during release of the arresting element, so that a person who uses the seat or the bed can adjust the rest member during the use by releasing the arresting element and respective bending of the upper part of the body, without manual action upon the rest member. Thereby, an especially comfortable and effortless adjustment of the inclination is possible.

Figure 10:
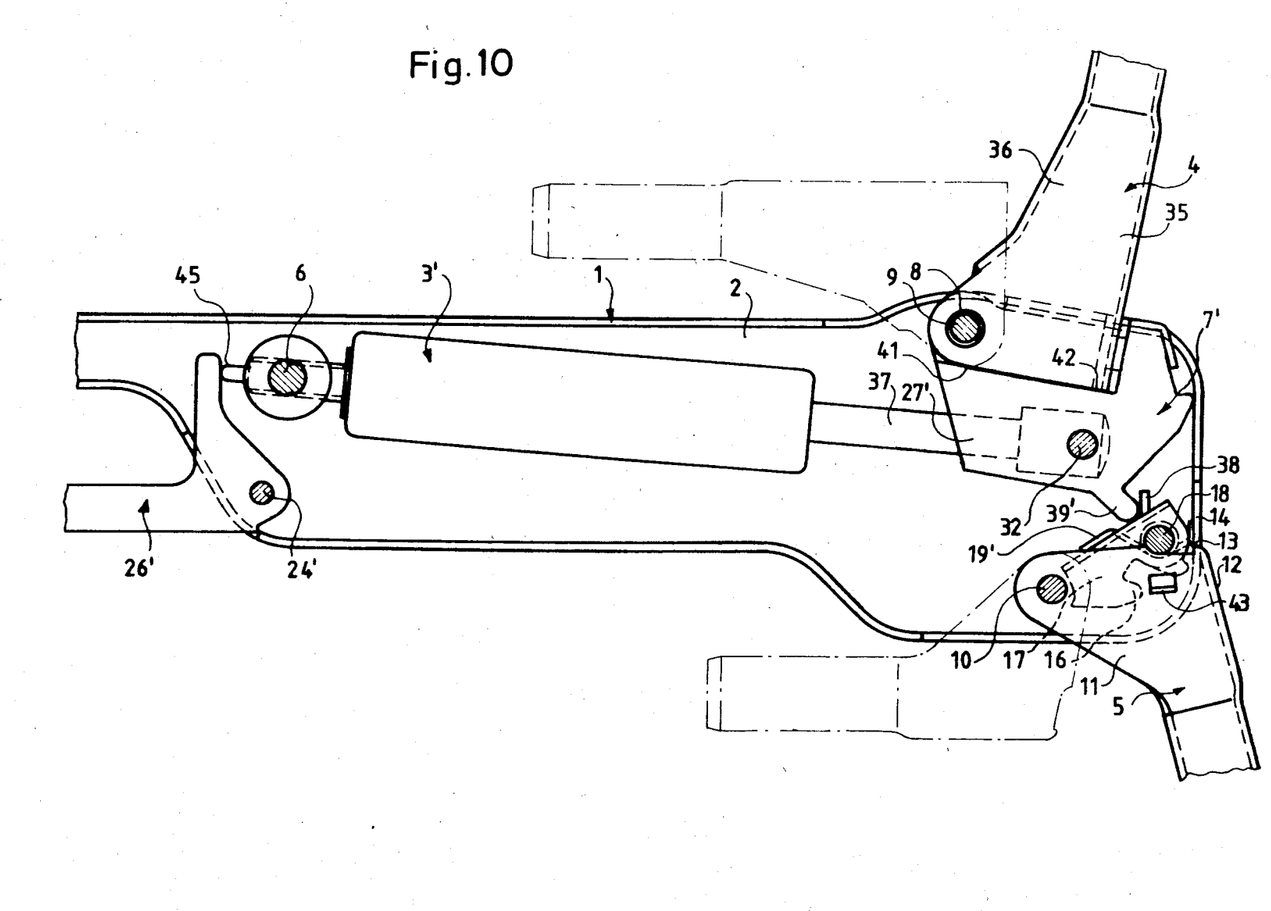
FIG. 10 is a view showing still a further embodiment of the present invention.

A hinge in accordance with the embodiment shown in FIG. 10 has the hinge part 4 which is freely turnable between its vertical position and its folded position shown in broken lines. It lies in the remaining turning region without additional arresting on the intermediate member 7'. In contrast to the embodiment shown in FIG. 9, the catch 30 is dispensed with. In the shown position, the intermediate member 7' abuts upwardly against the hinge shell 1. When the releasing device 45 releases a blockable gas spring 3' via the hand actuating member 26', the hinge part 4 can be turned for example by loading of the rest member in opening direction against the force of the gas spring 3' to the horizontal, for example by simple displacement of the upper part of the body. After releasing the manual actuating member 26', blocking of the gas spring 3' takes place, and it can no longer turn in the opening direction of the hinge part 4. In contrast, turning in the closing direction is possible, inasmuch as the hinge part 4 is not coupled with the intermediate member 7'. When a steeper position of the rest member is desirable, the hand actuating member 26 can again be actuated and thereby the gas spring 3' is unblocked. The gas spring 3' tends to turn the intermediate member 7' in closing direction of the hinge part 4. The turning movement of the hinge part 4 can be released, for example by lifting of the upper part of the body. Thereby a convenient adjustment of the steepness of the rest member without special lifting, automatically in the desirable position to maximum toward the vertical is provided.

In the vertical position of the hinge part 4 the foot catch 17 is disengaged via a projection 39' of the intermediate member 7', and the foot part 5 is released for folding to its position shown in broken lines in FIG. 10.

It will be understood that each of the elements described above, or two or more together, may also find a useful application in other types of constructions differing from the types described above.

While the invention has been illustrated and described as embodied in a hinge for an article for seating, lying, and the like, it is not intended to be limited to the details shown, since various modifications and structural changes may be made without departing in any way from the spirit of the present invention.

What is claimed as new and desired to be protected by Letters Patent is set forth in the appended claims:

1. A hinge, particularly of an article for lying, sitting and the like, comprising
 a hinge shell;
 a hinge part supporting a rest member, said hinge part being turnable relative to said hinge shell between and arrestable in a plurality of positions;
 a power element turning said hinge part in closing direction in forced manner and arresting said hinge part;
 an intermediate element turnably mounted on said hinge shell and connected with said power element, said intermediate element cooperating with said hinge part so that it is coupled with said hinge part in one turning region of said hinge part between a substantially horizontal and a substantially vertical position of the rest member, and said hinge part is separately turnable in a remaining turning region;
 a foot part lockable in an arrestable turning region and turnably supported on said hinge shell;
 and a foot catch turnably mounted on said hinge shell and connected with said power element, said intermediate element arranged to lock said foot part, said foot catch retaining said foot part in an arrestable turning region of said intermediate element and releasing the same in another position of the latter, said foot catch being controlled by said intermediate element.

2. A hinge as defined in claim 1, wherein said foot part has two plates turnably supported on said hinge shell and connected with one another by a lateral wall serving as an end stop cooperating with said hinge shell, said hinge shell having a rivet; and further comprising an engaging formation, said foot catch having a projection engageable with said engaging formation and turnably supported on said rivet of said hinge shell.

3. A hinge as defined in claim 2, wherein said engaging formation for said projection of said foot catch is formed as an opening in said lateral wall.

4. A hinge as defined in claim 2, wherein said engaging formation for said projection of said foot catch is formed as a projection of said plate.

5. A hinge, particularly of an article for lying, sitting and the like, comprising
 a hinge shell;
 a hinge part supporting a rest member, said hinge part being turnable relative to said hinge shell between and arrestable in a plurality of positions, said hinge part having an axis of turning;
 a power element turning said hinge part in closing direction in forced manner and arresting said hinge part;

an intermediate element turnably mounted on said hinge shell and connected with said power element, said intermediate element cooperating with said hinge part so that it is coupled with said hinge part in one turning region of said hinge part between a substantially horizontal and a substantially vertical position of the rest member, and said hinge part is separately turnable in a remaining turning region of said hinge part, said intermediate element being formed as a sheet disc turnable about said axis and, depending upon the position of said hinge part, is respectively coupled with and released from said hinge part, in its turning direction in the arrested condition;

a catch cooperating with said hinge part and turnably supported on said sheet disc with spring-biasing, said catch being engageable with said hinge part so that said power element is coupled with said hinge part;

a foot part lockable in an arrestable turning region and turnably supported on said hinge shell; and a foot catch turnably mounted on said hinge shell and connected with said power element, said intermediate element arranged to lock said foot part, said foot catch retaining said foot piece in an arrestable turning region of said intermediate element and releasing the same in another position of the latter, said foot catch being controlled by said intermediate element, said catch of said hinge part and said foot catch being formed as two-arm levers having free ends which in upper end position of said intermediate element abut each other and release said hinge part and said foot part.

* * * * *